Oct. 19, 1926.

L. J. GALE

ROLLING PIN

Filed May 24, 1922

1,603,683

Inventor
Lettie J. Gale
By Bacon & Thomas
Attorneys

Patented Oct. 19, 1926.

1,603,683

UNITED STATES PATENT OFFICE.

LETTIE J. GALE, OF DUNCAN, ARIZONA.

ROLLING PIN.

Application filed May 24, 1922. Serial No. 563,411.

It is an object of the invention to provide a rolling pin having an interior portion adapted to receive a supply of flour, condiments, or the like, with manually operable controlling means for discharging controlled quantities of the same at selected intervals from the rolling pin.

In a more specific aspect, my invention comprises a rolling pin provided with a hollow body portion receiving a pair of rotatable handles at each end thereof, with a side valve in one end of said pin controlling a multitude of apertures whereby the contents of the interior of the pin which may be flour or the like, are discharged in regulated quantities as needed.

Figure 1:
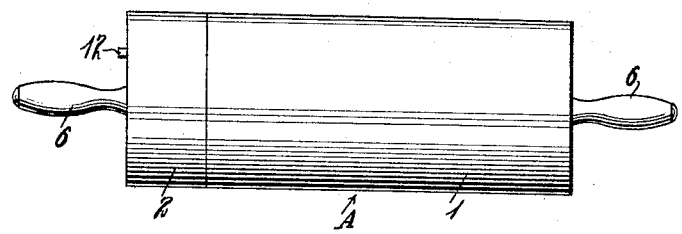
Figure 2:
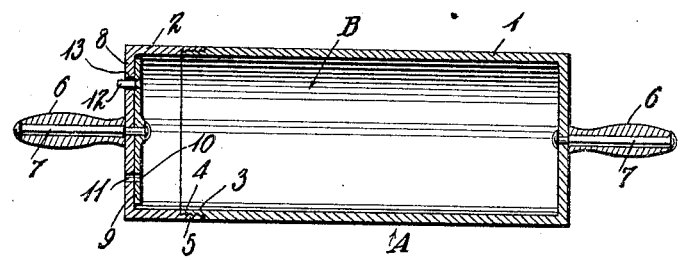
Figure 3:
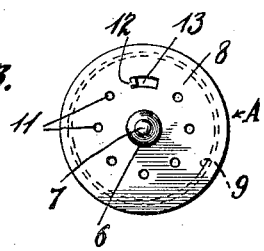

In the accompanying drawings I have shown a preferred embodiment of my invention in which Figure 1 illustrates a side elevation; and Figure 2 designates a sectional view through the pin; and, Figure 3 is a detail view.

Referring now more particularly to the drawings wherein like reference characters indicate corresponding parts, the letter A designates the rolling pin as a whole. Said pin is composed of the sections 1 and 2, the section 1 constituting the major portion of the pin and having a reduced part 3 near one edge, the surface of which is provided with screw threads 4. Each section of the pin is preferably composed of metal having the hollow interiors so as to provide the pocket B within the pin for the reception of flour, sugar, salt or the like. To the section 1 of the pin the hollow end part 2 is attached, the interior surface of said end part near one edge having threads 5 which cooperate with threads 4 on the section 1. By this construction the hollow end 2 may be united to the main section 1 so that the outer section of the pin, as a whole is smooth and continuous.

The pin is also provided with a pair of supporting handles 6, one being carried by each section thereof. Said handles are rotatably mounted on outwardly extending spindles 7 so that they may be grasped by the user while the pin is being rotated to control the discharge of the contents of the interior B of the pin, whether the same be flour, sugar or the like. I mount upon the interior surface of the end 8 of the section 2 a rotatable valve 9. This valve has a plurality of apertures 10 which are adapted to be moved into and out of alignment with corresponding apertures in the end plate 8 of the section 2. The valve 10 is also formed with an outwardly projecting pin 12 extending through a slot 13 in the section 8 whereby the user of the rolling pin may by grasping the said projecting pin 12 shift the valve 9 so that the apertures 10 therein are brought into registry with the apertures 11 in the end plate 2 to permit a controlled quantity of the flour or the like to be discharged from the interior A of the rolling pin, which constitutes a storage receptacle therefor.

When the device is in use, section 2 of the pin is first removed from the main section 1 and the interior B of the pin filled with flour or the like. This section is then replaced and the pin used as is customary, having a smooth outer surface throughout its length. The sections are preferably composed of metal, although other materials may be employed. After the section has been inserted in position the pin is used in the usual manner, and as well known to those skilled in the art, it is frequently necessary to place upon a rolling surface or the like small quantities of flour, sugar, or salt, and when such occasion arises it is only necessary to shift the valve operating pin 12 until the openings in the valve 9 register with the openings in the end section 2. By then shaking the rolling pin slightly the required quantity of flour or the like is discharged from the interior of the pin, whereupon the valve is closed and the operations above described may be repeated.

Having thus described my invention, what I claim is:

A rolling pin composed of connected major and minor sections, each section being of a tubular formation and having a hollow interior, the major section being provided with threads on a reduced part thereof at one end to receive complemental threads on the other section of said pin whereby the pin presents a smooth continuous outer surface when the sections are joined, end walls for said sections, one of said end walls having a multiplicity of discharge apertures therein, a rotatable disk valve associated with said end wall and having a multiplicity of corresponding apertures therein, an arcuate slot in said end wall, a pin rigidly attached to the disk valve and projecting through the arcuate slot for rotating said disk into operative or inoperative positions, and handles connected to the ends of the rolling pin, said connecting means for one of said handles extending through one of said end walls and forming a means for rotatably supporting said disk valve.

In testimony whereof I affix my signature.

LETTIE J. GALE.